United States Patent

Hartmann

[11] Patent Number: 5,861,099
[45] Date of Patent: *Jan. 19, 1999

[54] PROCESS FOR THE FILTRATION OF SUSPENSIONS CONTAINING SULFUR

[75] Inventor: Achim Hartmann, Pulheim, Germany

[73] Assignee: Rheox, Inc., Hightstown, N.J.

[*] Notice: The terminal 35 months of this patent has been disclaimed.

[21] Appl. No.: 188,978

[22] Filed: Jan. 31, 1994

[30] Foreign Application Priority Data

Feb. 6, 1993 [DE] Germany .................. 43 03 486.1

[51] Int. Cl.⁶ .................................................. C02F 1/02
[52] U.S. Cl. .................. 210/710; 23/293.5; 210/737; 423/224; 423/578.1
[58] Field of Search .................. 23/293 S; 210/702, 210/710, 737, 772; 423/224, 578.1

[56] References Cited

U.S. PATENT DOCUMENTS

| | | | |
|---|---|---|---|
| 4,304,570 | 12/1981 | Kleeberg et al. | 210/773 |
| 4,631,068 | 12/1986 | Baker et al. | 23/293 S |
| 4,647,287 | 3/1987 | Audch | 23/293 S |
| 4,876,079 | 10/1989 | Kliem et al. | 423/578.1 |
| 5,049,370 | 9/1991 | Hasebe et al. | 423/578.1 |

*Primary Examiner*—Peter A. Hruskoci
*Attorney, Agent, or Firm*—Michael J. Cronin

[57] ABSTRACT

To improve the separation of dispersedly precipitated sulfur from a washing solution used in the oxidative washing of hydrogen sulfide containing waste gases, the suspension is heated before filtration to about 45° C. to 70° C. Such heating causes the sulfur contained in the solution to coagulate into large flocks and form a mass of high purity sulfur which is largely non-thixotropic. This mass, often called a filter cake, can be washed and utilized in a large number of ways as a source of sulfur.

6 Claims, 1 Drawing Sheet

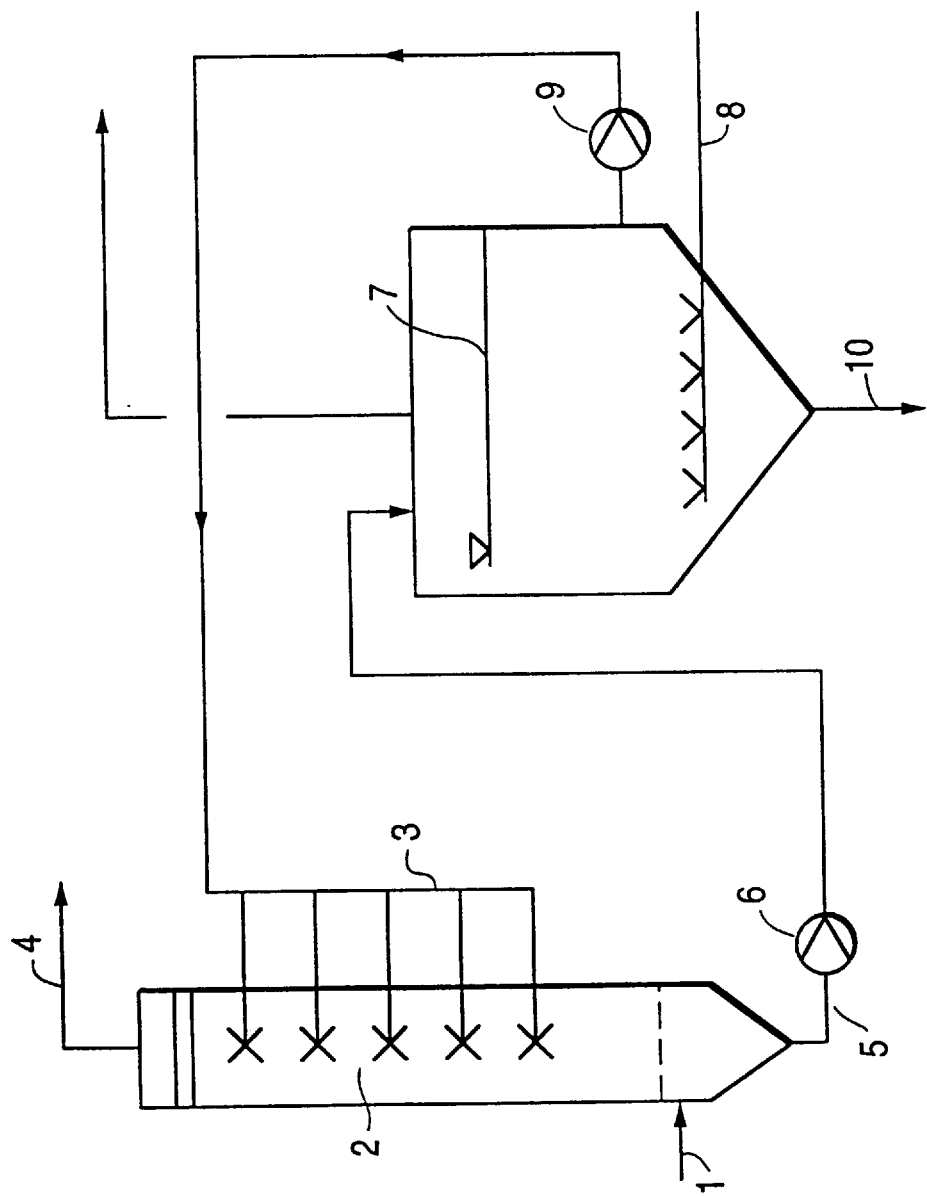

PROCESS FOR THE FILTRATION OF SUSPENSIONS CONTAINING SULFUR

CROSS REFERENCE TO RELATED APPLICATION

This application is a United States counterpart application to originating german language German Patent Application No. P43 03 486.1 filed Feb. 6, 1993, the disclosure of which is hereby incorporated by reference.

FIELD OF THE INVENTION

The present invention relates to a process for separating sulfur from a suspension by filtration to form a filter cake. Such suspension results from the removal of sulfur from exhaust gases. The sulfur containing filter cake can then be subsequently washed and further utilized for a wide variety of chemistry uses as a sulfur containing raw material.

BACKGROUND OF THE INVENTION

Removal of sulfur from exhaust gases is an important environmental task facing many industrial manufacturers throughout the developed world. Many processes for the removal of such sulfur involve the purification of exhaust gases by the removal first, by separation, of the sulfur which is, in the gas, in a hydrogen sulfide form.

One example of a manufacturing process which produces sulfur in exhaust gas is the preparation of titanium dioxide pigments. Other manufacturing industries producing sulfur in exhaust gases include, for example, electricity generation, paper and pulp making, automotive manufacture, various industries utilizing coal as a heating or other type fuel and pharmaceutical manufacture. Many other manufacturing processes in various industries from chemical manufacturers to petroleum companies face similar problems of sulfur removal from exhaust gases.

It has been considered most practical to carry out the separation of the sulfur before the disposal to the atmosphere, or in some cases burning of the exhaust gas, because the quantity of gas to be purified is thus considerably smaller. The sulfur removal from the gas can comprise two or more steps. Normally the hydrolysis of carbonyl sulfide occurs followed by the oxidation of the resulting hydrogen sulfide.

The removal of hydrogen sulfide from gaseous streams, such as the waste gases liberated in the course of various industrial chemical processes, for example, in the pulping of wood, has become increasingly important in combating atmospheric pollution. Such waste gases not only have an offensive odor, but they may also cause damage to vegetation, painted surfaces, and wild life, besides constituting a health hazard to humans. The authorities in many countries including the United States and Western Europe have increasingly imposed lower and lower tolerances on the content of such gases vented to the atmosphere, and it is now imperative in many localities to remove virtually all of the hydrogen sulfide, under the penalty of an absolute ban on continuing operation of the plant.

A number of U.S. patents describe methods of removing hydrogen sulfide from a gaseous fluid stream. Several patents in the name of Ari Technology, and its predecessor companies, discuss various removal methods. See for example, U.S. Pat. Nos. 4,622,212, 4,218,342 and 4,014,983. Ari Technology sells a commercial process for such removal under the tradename "LO-CAT Process".

Washings with oxidizing solutions have been considered for separating hydrogen sulfide from exhaust gases. In such process, a very finely divided sulfur precipitates into a solution which is an alkaline suspension of sulfur. When filtered, the resultant product, called a filter cake, proves difficult to handle, most often on account of its thixotropy. This has lead companies to utilize commercial processes which recover the sulfur in a molten, and not a solid form without a filter cake. This has proved costly and has required expensive complicated equipment.

Such costly prior art recovery processes have generally heated sulfur-containing suspensions under pressure to about 140° C. The sulfur melts thereby forming a liquid phase, which is then drawn off. U.S. Pat. No. 4,730,369 describes a method and apparatus for recovering sulfur from an aqueous slurry. The slurry is heated sufficently to melt the sulfur and two different separation zones, in an extremely complicated apparatus, separate and transport the sulfur and the aqueous liquid. Methods prior to this patent for liquefying sulfur in an aqueous slurry typically involved passing the slurry through shell-and-tube heat exchangers having horizontal tubes, and conveying the heated effluent to a separator in which phase separtion would occur. The process often involved supernatant aqueous catalytic reagents being recycled to the process, and the lower liquid sulfur phase being transferred by appropriate means to storage. In such operations if the concentration of solid sulfur in the suspension exceeded relatively low values, e.g., 5–10%, the solid sulfur had a tendency to plug the tubes of the exchanger. The efficiency of separation in the separating vessel was poor, since the relatively high velocity of the aqueous phase, passing vertically through the separator captured small particles of sulfur and thus lead to operating difficulties in other sections of the process. This process is expensive with regard to energy and for smaller installations is uneconomical because of high capital cost. For further production of usable powdery sulfur, the liquid sulfur product would then have to be solidified, broken-up and ground. In U.S. Pat. No. 4,304,570, elemental sulfur obtained from the scrubbing of exhaust gases is suspended in a solution and is preheated with steam to a temperature above the melting point of the sulfur with complicated downstream apparatus then handling the molten sulfur. As recently as 1989, U.S. Pat. No. 4,876,079 to Linde Aktiengellschaft described a process for separating sulfur from a sulfur/alkaline solution by first heating the solution to a temperature above the melting temperature of the sulfur changing the sulfur from a solid state to a liquid state.

In view of the cost and inconvenience of these molton sulfur processes, commercial manufacturing engineers have long sought without success a simple "solid" process to substantially improve the filterability of dispersed sulfur suspensions accruing from an exhaust gas wash in which a non-thixotropic filter cake with high solids content was produced.

SUMMARY OF THE INVENTION

The invention is directed to a process for separating dispersed sulfur, which has been formed in an oxidative washing of exhaust gases containing hydrogen sulfide, from an alkaline suspension via filtration and washing of the filter cake. The process is distinguished by its simplicity and efficiency and is based on the realization that as part of an effective removal process the separation of sulfur in a predominantly alkaline liquid can be accomplished without the need to first convert the sulphur into the liquid phase.

According to the instant invention, by the thermal treatment of the alkaline suspension a spontaneous coagulation of the sulfur is caused to occur. The sulfur flocks or particles formed attain, subject to varying conditions of the treatment, diameters up to 3 mm and demonstrate outstanding settling behavior. The filter cake which results can in a preferred embodiment be washed after the treatment in contrast to thixotropic filter cake accruing in the filtration of an untreated suspension; such cake is often puncture proof and is distinguished by a high percentage of solids compared to untreated suspensions.

A heating of the suspension by direct introduction of steam is especially preferred although heating by any other mechanism would also provide improved results. Temperatures of at least 45° C. to about 70° C. should be utilized. The suspension should preferably be maintained for at least about 5 minutes at the elevated temperature but improved results at lower times may also be achieved. Additional improvement regarding the solids content of the filter cake can be achieved, if the filter cake is washed with cold water after it has formed.

BRIEF DESCRIPTION OF THE DRAWING

The creation of a sulfur containing suspension is illustrated in the drawing. The drawing shows a commercial installation schematically in which a suspension loaded with dispersed sulfur collects as, for example, in a gas washing according to the LO-CAT process.

A hydrogen sulfide-containing exhaust gas (1) is fed into the bottom of a washing tower (2) and is sprayed in the tower at various locations with an oxidizing wash solution (3). Hydrogen sulfide is converted to elemental sulfur which goes into the wash solution. Purified gas (4) is drawn-off at the top of the washing tower. The now sulfur-containing wash solution (5) is removed from the base region of the washing tower via a pump (6) and pumped into tank (7). In the tank the oxidation of the wash solution takes place via injection of air (8). A pump (9) recirculates the regenerated solution into the washing tower (2). A thickened sulfur-containing suspension (10) is drawn-off at the bottom of the tank and filtered. Through a recycling connection and if necessary, through a replenishment, both not portrayed, it is insured that the wash solution can be circulated without reaching undesirable levels of inactivity in a circuit.

The following examples illustrate the invention. The waste gas originated in these examples was produced by an installation for chlorinating ores containing titanium dioxide.

EXAMPLE 1

Exhaust gas fed to a washer in experiments had the following composition:

| | | |
|---|---|---|
| CO | 42.0% | |
| $CO_2$ | 35.6% | |
| $N_2$ | 21.7% | |
| $H_2S$ | 0.7% (vol.) | |

A washing solution utilized had the following composition:

| | |
|---|---|
| Sodium Hydrogen Carbonate | 3.5% (wt.) |
| Sodium Carbonate | 1.0% (wt.) |
| Sodium Thiosulfate | 7.0% (wt.) |
| Sulfur | 0.5% (wt.) |
| Iron (III)-(tied-up with chelatiore) | 0.2% (wt.) |

Utilizing the above technique, up to 99.98% (wt.) of the hydrogen sulfide was converted in the washer to elemental sulfur. 100 lt/hr. of waste gas were conveyed to the washer. 40 $mm^3$/hr of air were injected at 25° C. into the oxidation vessel and 0.1 lt/h of suspension with a sulfur content of 9.8% (wt.) were continuously drawn off.

In the following examples, various filtrations were carried out (batchwise) with the suspension drawn off at the bottom of the tank from Example 1.

EXAMPLE 2 (COMPARATIVE EXAMPLE)

800 ml of the sulfur-containing suspension was filtered at 25° C. on a suction filter (diameter 9 cm, vacuum 100 mbar). The time of filtration was 62 seconds. The filter cake was determined to be thixotropic and contain 48.5% (wt.) sulfur.

EXAMPLE 3 (COMPARATIVE EXAMPLE)

800 ml of the sulfur-containing suspension were heated up to 40° C. in 5 minutes and then filtered under the same conditions as in example 2. The time of filtration was 63 seconds; the filter cake was a thixotropic cake and contained 48.3% (wt.) sulfur.

EXAMPLE 4

A similar amount of the sulfur-containing suspension as Examples 2 & 3 was heated before filtration to 50° C. by introduction of steam. It was observed that a visible coagulation of finely divided sulfur took place. The time of filtration was lowered to 45 seconds; the filter cake was determined to be non-thixotropic in that it was puncture-proof. The cake contained 60% (wt.) sulfur.

EXAMPLE 5

800 ml of the sulfur-containing suspension were heated to 60° C. in 5 minutes. Sulfur coagulated in the form of still coarser flocks than in example 4. The time of filtration was 28 seconds and the puncture-proof filter cake contained 71% (wt.) sulfur.

The following examples utilized a sulfur-containing wash solution, which has been withdrawn from a titanium dioxide production installation with waste gas purification. The withdrawn suspension had a sulfur content of 4% (wt.). Through decantation the sulfur content was increased to 9.8% (wt.) for the following examples.

EXAMPLE 6 (COMPARATIVE EXAMPLE)

800 ml of the solution were filtered at 36° C. (the temperature attained in the production installation). The time of filtration was 65 seconds; the filter cake was determined to be thixotropic and the sulfur content was measured as 45.2% (wt.).

EXAMPLE 7

800 ml of the same suspension as in example 6 were heated to 60° C. The sulfur was observed to coagulate and yielded a strongly flocculated suspension. A puncture-proof filter cake with 70.1% (wt.) sulfur was obtained in a filtration time of 30 seconds.

The following claims are intended to describe the invention but are not intended to limit the invention to the specific embodiment shown above.

What is claimed:

1. A process for separating dispersed sulfur contained in a sulfur containing alkaline suspension formed by the oxidative washing of a hydrogen sulfide containing gas comprising the steps of heating the suspension to increase its temperature to at least 45° C. but no more than about 70° C. thereby causing coagulated sulfur solid particles to form and then filtering the suspension to form from such particles a non-thixotropic sulfur-containing filter cake.

2. The process according to claim 1, wherever the suspension is heated through direct introduction of steam.

3. The process according to claim 1, wherein the suspension is heated to about 60° C. before filtering.

4. The process according to claim 1, wherein the suspension is held for at least 5 minutes at the increased temperature.

5. The process according to claim 1, comprising the additional step of washing the sulfur-containing filter cake with water.

6. The process according to claim 1, wherein the hydrogen sulfide containing gas was obtained from a manufacturing process selected from titanium dioxide manufacture, coal burning public electrical utility manufacture and pharmaceutical manufacture.

* * * * *